United States Patent Office 2,971,818

Patented Feb. 14, 1961

2,971,818

PRODUCTION OF AMMONIUM HEXAMETAPHOSPHATE BY CATION EXCHANGE RESIN

Murray A. Kaplan, Syracuse, and Frank H. Buckwalter, De Witt, N.Y., assignors, by mesne assignments, to Bristol-Myers Company, New York, N.Y., a corporation of Delaware No Drawing. Filed Aug. 28, 1957, Ser. No. 680,666

3 Claims. (Cl. 23—107)

This invention relates to a new chemical compound and, more particularly, to ammonium hexametaphosphate and processes for its preparation.

The ammonium hexametaphosphate of the present invention is a highly effective and water-soluble water-softener, i.e., about 1½–3 ounces of solid ammonium hexametaphosphate will soften 100 gallons of water with a total hardness of 1 grain per gallon. It is also a very useful chemical intermediate; thus it is used to produce tetracycline ammonium hexametaphosphate, which is a compound of tetracycline having great therapeutic utility, i.e. providing high or rapidly attained blood levels of tetracycline upon oral administration to man or animals, containing no components which are harmful even in occasional cases (e.g. as is sodium in cardiac or hypertensive patients) and having desirable physical properties, e.g. being non-hygroscopic.

There is now provided by the present invention the compound ammonium hexametaphosphate and, in a preferred embodiment, solid ammonium hexametaphosphate substantially free of sodium.

There is further provided by the present invention a process for the production of ammonium hexametaphosphate comprising passage of an aqueous solution of sodium hexametaphosphate through a column containing a strongly acidic cation exchange resin in the hydrogen cycle followed by immediate neutralization of the effluent with ammonia.

The ammonium hexametaphosphate is used to prepare the new tetracycline complex by mixing aqueous, acid solutions of tetracycline, e.g. tetracycline hydrochloride, and ammonium hexametaphosphate and collecting by filtration under acid conditions the precipitated crystalline salt. The ratios by weight of tetracycline hydrochloride to ammonium hexametaphosphate to be used can vary widely; ratios of 1:2 to 1:0.05 are effective and about 1:0.25 or 1:0.33 is preferred. The acidity must be sufficient to maintain the tetracycline reagent in solution, e.e. less than about pH 2.0. The insolubility of the product makes the concentration used of little importance; reasonably concentrated solutions are, of course, more practical. A detailed example is given below.

The ammonium hexametaphosphate of the present invention, either as a solid or as an aqueous solution, is particularly useful for the purpose of increasing the blood levels obtained upon oral administration of the antibiotic tetracycline, e.g. in capsules or as a suspension in an aqueous vehicle. Thus, the solid ammonium hexametaphosphate (50 to 500 mgms. and preferably 250 or 380 mgms.) is encapsulated with 250 mgms. amphoteric tetracycline or amphoteric tetracycline is suspended at a concentration of 125 mgm./5 cc. in an aqueous solution containing 25 to 250 mgm./5 cc., and preferably about 100 mgms./5 cc., of ammonium hexametaphosphate. Such mixtures are a great improvement over the present commercial mixtures of tetracycline and sodium hexametaphosphate because the former do not supply large amounts of sodium ion which are highly undesirable and harmful to cardiac patients, hypertensives and any patients on a low salt diet.

The ammonium hexametaphosphate of the present invention is prepared as set forth in detail below. In general, an aqueous solution of sodium hexametaphosphate, e.g. 0.01 to 10% by weight and preferably about 1 to 5%, is passed through a column containing a strongly acidic cation exchange resin preferably of the sulfonic type, in the hydrogen form. The dimensions of the column are of no importance except that it must be at least three times as high as it is wide. In other words, a batch process is not effective and a column is used so that the liquid containing the least sodium ion is brought into contact with relatively fresh resin at the end of the column. Use is made of any of the strongly acidic cation exchange resins such as those of the phenolic methylene sulfonic type, the nuclear sulfonic type or the sulfonated coal type. Such exchanges are described in U.S. Patents 2,191,853 (which discloses a sulfited condensation product of a phenolic compound and a methylene body such as formaldehyde used as a cation exchange resin); 2,366,-007 (which discloses sulfonated polymers of polyvinyl aryl compounds such as a copolymer of styrene and divinyl benzene as cation exchange resins); 2,518,420 (which discloses sulfonated phenol-formaldehyde copolymers as cation exchange resins); BIOS Report 621, item 22 (1946) which discloses the manufacture of Wofatit ion exchange resins; and U.S. Bureau of Mines Report of Investigations, No. 3559 (1941), by Broderick and Bogard which discusses cation exchange resins obtained by sulfonating coal. Exchangers of these types are sold under various designations, such as Amberlite IR–100 (a phenolic methylene sulfonic resin); Amberlite IR–105 (a phenolic methylene sulfonic resin); Amberlite IR–120 (a polystyrene base, high capacity, sulfonic acid cation exchanger, strongly acidic), Wofatit P (the reaction product of phenol, formaldehyde and sodium sulfite, which is then treated with sulfuric acid); Wofatit K (obtained by reacting formaldehyde with the reaction product of benzaldehyde 2,4- disulfonic acid and a mixture of phenol and resorcinol); and Zeo Karb (a sulfonated coal, cation exchanger). Amberlite IR–120 is preferred. The quantity of resin to be used need only be that having the capacity to replace with hydrogen ion all of the sodium ion in the sodium hexametaphosphate solution; in general, use is made of at least 1 ml., and preferably about 10 mls., wet resin per gram of sodium hexametaphosphate. The effluent from the column is an aqueous solution of hexametaphosphoric acid which contains no other ions and, in particular, contains no substantial amount of sodium, orthophosphate or pyrophosphate ions. As this aqueous acid comes from the column, it is immediately neutralized with ammonia. It is convenient to use concentrated ammonium hydroxide and to assure neutralization by thus adjusting the pH to about 7.0, e.g. 7.4. There is thus formed ammonium hexametaphosphate which can be isolated as a solid from its aqueous solution in various ways, most easily after concentration by distillation in vacuo, e.g. by lyophilization or by precipitation by the addition of acetone.

A more comprehensive understanding of this invention is obtained by reference to the following examples which are illustrative only and are not the exclusive embodiment of the invention.

*Example 1*

Cation exchange resin of the polystyrene nuclear sulfonic acid type, i.e. Amberlite IR–120 (600 mls. wet resin), was packed in a 1½ x 18″ column and 4 l. of 3 N HCl was percolated through the column followed by 1.0 l. distilled water. Through this column in the hydrogen cycle there was then passed a solution of 65 g. sodium hexametaphosphate dissolved in 3200 ml. water at the rate of 0.1 ml./ml. resin/minute, i.e. 60 ml./minute. The acid effluent, which was an aqueous solution of hexametaphosphoric acid, was adjusted to pH 7.4 with concentrated $NH_4OH$ as it came from the column. The column was then washed with 400 ml. water, and the wash effluent was adjusted to pH 7.4 with $NH_4OH$ and added to the previous effluent. The composited solution was concentrated by distillation in vacuo to 500 ml. and then lyophilized to give 64 g. white, amorphous solid ammonium hexametaphosphate.

This product contained by analysis 5.3% water (Karl-Fischer), 0.02% sodium and 17.6% ammonium. Substantially all the phosphorus was shown by paper chromatography to be in the form of hexametaphosphate, i.e. not to have been degraded to orthophosphate or pyrophosphate.

The ammonium hexametaphosphate contains the elements nitrogen, hydrogen, phosphorus and oxygen substantially in accord with the empirical formula $NH_4PO_3$.

*Example 2*

Ammonium hexametaphosphate (5 g.) was added to a rapidly stirred solution of tetracycline hydrochloride (15 g.) dissolved in 150 ml. water adjusted to pH 1.7 with concentrated hydrochloric acid. During the addition the pH was maintained at 1.7 by the addition of concentrated hydrochloric acid. After standing for two hours at room temperature, the yellow crystalline tetracycline ammonium hexametaphosphate which precipitated was collected by filtration, washed with 100 ml. water and then 100 ml. acetone, dried in vacuo over $P_2O_5$ at room temperature for two days and then found to weigh 8.0 grams and to assay 880 mcg. tetracycline hydrochloride equivalents per mgm. by bio-assay and 826 by chemical assay. Found: $H_2O$, 3.3% (Karl-Fischer); Na, 0.0 19%; P, 7.8%; N, 5.17%; $NH_4$, 0.76%, 0.87%.

Solubility in water of a saturated solution at room temperature: 14 mgm./ml.; pH=2.7. This product contained by analysis 5.3% water (Karl-Fischer), 0.02% sodium and 17.6% ammonium. Substantially all the phosphorus was shown by paper chromatography to be in the form of hexametaphosphate, i.e. not to have been degraded to orthophosphate or pyrophosphate.

We claim:

1. A process for the production of an aqueous solution consisting of ammonium hexametaphosphate and water comprising passing an aqueous solution of sodium hexametaphosphate containing, as impurities, sodium ions, orthophosphate ions, and pyrophosphate ions, through a column containing a sulfonic acid cation exchange resin capable of removing the sodium ion impurities, immediately neutralizing the effluent from said column to a pH of about 7.0 with ammonia and recovering an aqueous solution consisting of ammonium hexametaphosphate and water from said effluent.

2. A process for the production of an aqueous solution consisting of ammonium hexametaphosphate and water comprising passing an aqueous solution of sodium hexametaphosphate containing, as impurities, sodium ions, orthophosphate ions and pyrophosphate ions, through a column containing an acidic cation exchange resin capable of removing the sodium ion impurities selected from the group consisting of phenolic methylene sulfonic resins, sulfonated polymers of polyvinyl aryl compounds and sulfonated coal, immediately neutralizing the effluent from said column to a pH of about 7.0 with ammonia and recovering the aqueous solution consisting of ammonium hexametaphosphate and water from said effluent.

3. A process for the production of ammonium hexametaphosphate comprising passing an aqueous solution containing from 1 to 5 percent by weight of sodium hexametaphosphate and containing as impurities, sodium ions, orthophosphate ions and pyrophosphate ions, through a column containing a sulfonic acid cation exchange resin capable of removing the sodium ion impurities, neutralizing the effluent from said column to a pH of about 7.4 with ammonium hydroxide whereby ammonium hexametaphosphate is formed in solution in said effluent and recovering solid ammonium hexametaphosphate from said effluent, said ammonium hexametaphosphate being substantially free of sodium, orthophosphate and pyrophosphate ions.

References Cited in the file of this patent

UNITED STATES PATENTS

| | | |
|---|---|---|
| Re. 20,754 | Rosenstein | June 7, 1938 |
| 2,024,543 | Smith | Dec. 17, 1935 |
| 2,035,652 | Hall | Mar. 31, 1936 |
| 2,108,783 | Smith | Feb. 15, 1938 |
| 2,130,557 | Munter | Sept. 20, 1938 |
| 2,191,199 | Hall | Feb. 20, 1940 |
| 2,557,109 | Iler | June 19, 1951 |